Figure 1:
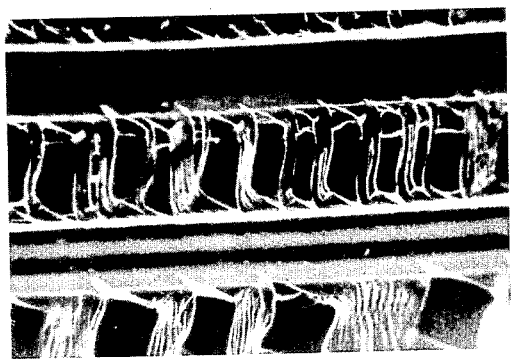

United States Patent [19]

Rasmussen

[11] 3,954,933
[45] May 4, 1976

[54] RETICULAR STRUCTURE DERIVED FROM FILM AND METHOD OF MANUFACTURING SAID STRUCTURE

[75] Inventor: Ole-Bendt Rasmussen, Birkerod, Denmark

[73] Assignee: Societe F. Beghin, Thumeries, France

[22] Filed: Feb. 21, 1974

[21] Appl. No.: 444,503

Related U.S. Application Data

[63] Continuation of Ser. No. 164,686, July 21, 1971, abandoned.

[30] Foreign Application Priority Data

July 21, 1970 United Kingdom............... 35334/70

[52] U.S. Cl................................. 264/145; 264/147; 264/160; 264/171; 264/284; 264/289; 264/DIG. 47; 264/344
[51] Int. Cl.²........................................ B29C 17/10
[58] Field of Search........... 264/145, 147, 289, 160, 264/210 R, DIG. 47, 171, 344, 284

[56] References Cited
UNITED STATES PATENTS

| | | | |
|---|---|---|---|
| 2,505,146 | 4/1950 | Ryan................................... | 264/289 |
| 3,137,746 | 6/1964 | Seymour et al...................... | 264/289 |
| 3,350,491 | 10/1967 | Rasmussen.......................... | 264/289 |
| 3,468,461 | 9/1969 | Rasmussen.......................... | 264/147 |
| 3,488,415 | 1/1970 | Patchell et al...................... | 264/154 |
| 3,511,901 | 5/1970 | Brown................................. | 264/154 |
| 3,541,197 | 11/1970 | Hughes............................... | 264/154 |
| 3,724,198 | 4/1973 | Kim.................................... | 57/140 R |
| 3,746,607 | 7/1973 | Harmon et al...................... | 264/288 |

*Primary Examiner*—Jeffery R. Thurlow
*Attorney, Agent, or Firm*—William J. Daniel

[57] ABSTRACT

A reticular split film comprising transverse, relatively thick, oriented, regularly formed stemfibres and intervening relatively thin, and generally irregularly formed branchfibres, which are biaxially oriented and film-shaped in areas adjacent to the stemfibres and more fibre-shaped over the rest of their length.

The structure is produced by embossing (profiling) a film in a biased or perpendicular line pattern, orienting and splitting the thin intervening portions between the thicker striations while shearing the striations relative to one another, and finally orienting the striations.

11 Claims, 14 Drawing Figures

RETICULAR STRUCTURE DERIVED FROM FILM AND METHOD OF MANUFACTURING SAID STRUCTURE

This is a continuation of Ser. No. 164,686, filed July 21, 1971, now abandoned.

The present invention relates to a reticular structure derived from a polymer film. There is a need for thin, strong and cheap reticular structures, in particular for reinforcement in disposable fabrics, for airtransmitting wrapping material, carpet backing, filters and the like. Several patents and other treatments of the subject suggest that the route over a film would be the most suitable, but because of principal drawbacks or complications in developments, neither of these products or methods have been industrialized on a scale which has any proportion to the supposed market for products of this kind.

Thus, British Pat. No. 1,054,946 discloses a sheet product formed by fibrillation of a uniaxially oriented film in a pattern of splitting which has produced relatively long and wide "stemfibres" and relatively short and narrow "branchfibres" that bridge the stemfibres and are branched off from the stemfibres in a regular sealing. Although the product appears to have two fibre directions, it is, in reality, still a uniaxially oriented film in which one set of linear portions is split while the resultant array of fibres is deflected away from the remaining, unsplit linear portions. In this pattern of splitting, the direction of orientation will cross from edge to edge in each stemfibre, usually at a rather small angle to the longitudinal direction of said fibre. In said patent it is further disclosed to reinforce the forking points by an after-stretching carried out at elevated temperature and in the direction of the branchfibres. In this manner the deflections are stabilized and a minor amount of biaxial orientation may be produced at the ends of each split. However, the product is still essentially a uniaxially oriented, split film, and the strength of the stemfibres turns out to be very much lower than the strength of longitudinally oriented ribbons of the same polymer.

The present invention concerns a reticular sheet which is particularly suitable as reinforcement layer in disposable fabric or for other of the above-mentioned purposes, and can be manufactured in simple and cheap manner. Like the above-mentioned structure, the present sheet comprises parallel relatively long stemfibres and relatively short intervening branchfibres which are integrally connected with said stemfibres. The product according to the present invention is characterized in that the stemfibres are materially thicker than the branchfibres and are uniaxially oriented in their longitudinal direction, while the branchfibres consist of an array of traversing, generally parallel split film portions between each pair of adjacent stemfibres, and are biaxially oriented and generally film-shaped in area adjacent to the stemfibres and generally uniaxially oriented and nonfibre-shaped over the rest of their length. This product can be produced from a film by combinations of embossment and several steps of stretching, as will be described below.

The striations establish the direction of major strength of the sheet, and generally it should be cross-laminated with another reticular or fibrous layer having a major direction of strength, e.g. with a layer which also has the structure defined above.

Due to the fact that the branchfibres are relatively thin film portions in the areas adjacent to the stemfibres and further due to the biaxial orientation of said areas, the notch effect caused by the branching off on the edges of the stemfibres is surprisingly low. The fact that the rest of each branchfibre is generally uniaxially oriented and fibreshaped over the rest of their length, provides for a good flexibility and/or bondings to other layers when the sheet is laminated.

Although the intervening portions generally establish only a secondary or minor direction of strength they have, for several reasons, high importance. Before and during lamination, they essentially facilitate the handling of the ply, and in the final product they increase the tear resistance and reduce the need for use of adhesive bondings. Thus, the final product can be made softer, with a better drape effect and with diagonal flexibility. For obtaining this, the adhesive bonding of the laminate may be spot-bonding.

The stemfibres should preferably be spaced from one another in predetermined, generally regular manner, while each array of branchfibres should preferably be a randomly split film portion. The predetermined and generally regular pattern of the fibres which form the major direction of strength is important for the strength and evenness of the sheet, while the randomness among the fibres of secondary importance makes the product simpler, easier to produce and cheaper. Further in order to (see below)

(*) simplify the process each intervening portion is of substantially even thickness.

In an embodiment of the sheet according to the invention, the stemfibres are generally perpendicular to the longitudinal direction of the sheet, and in another embodiment the stemfibres are on bias in relation to the longitudinal direction of the sheet, e.g. forming an angle between about 25° and 65° with said direction. It is also possible to have the stemfibres arranged parallel to the longitudinal direction of the sheet, but there is a particular need for a simple reticular sheet where the major direction of strength is perpendicular to the longitudinal direction or is on bias, and which is still easy to handle. In case said direction is perpendicular, it can be laminated, e.g. to a carded web or to a longitudinally oriented fibrillated film. In case said direction is on bias, it can e.g. be laminated to another sheet of the same structure in such manner that the two stemfibre directions become generally perpendicular to each other.

In the simplest forms, the sheet according to the invention is formed of a single-layer film, in particular a film of h.d. polyethylene or of crystalline polypropylene, but in a special embodiment it consists of at least two adhesively bonded layers $a$ and $b$ of which $a$ extends through both stemfibres and branchfibres and forms at least a major proportion of each branchfibre, while $b$ forms a major proportion of the stemfibres, but is expelled from he branchfibres. Thus, the proportion between $a$ and $b$ is much higher in the branchfibres than it is in the stemfibres, and the branchfibres may even be devoid of the layer $b$. These different proportions are obtained mainly by squeezing the layers $a$ and $b$ differently during the embossing of the layered film from which the sheet is produced, as will be explained further below.

In this embodiment it is possible to achieve different material properties in the stemfibres and the branchfibres, e.g. the stemfibres may be formed predominantly of cheap polymers of high tensile strength, such as h.d. polyethylene or polypropylene, while the branchfibres may predominantly consist of a more expensive copolymer, which is tailor-made for the adhesive function. In this connection, it should be noted that the branchfibres may form a minor weight proportion, but at the same time may form by far the biggest surface area of the sheet.

In order to obtain a sufficient adhesion between the selected layers, there may further be used an adhesive layer.

Another and very advantageous use of the layered structure, where one or some components are, so to say, removed from the branchfibres by squeezing, is further characterized in that $a$ is formed of a very splittable polymer material and $b$ of a less splittable polymer material. While the branchfibres hereby become very fine, the notch-effects on the edges of the stemfibres will become further reduced. In this manner it is also possible to choose a softer polymer for the stemfibres, thus achieving a still more flexible sheet.

The present invention further comprises a method for manufacturing the reticular sheet described above. Said method consists in the steps of forming and embossing a film in a line pattern to form relatively thick striations and thin intervening portions, orienting said intervening portions in generally uniaxial manner at an angle to the striations, while materially keeping the striations unoriented, subsequently splitting the intervening portions and orienting the striations in their longitudinal directions. The splitting is preferably a splitting at random, as this is simplest and cheapest (cf. the description of the product).

The film can be produced by extrusion, casting from solution or emulsion, or in some cases by casting of a prepolymer which is cured. The embossment can be carried out either as an independent process or as part of the film formation. In the former case calendering with an embossed roller or impressing with a vibrating edge can be used, while in the latter case the film may be extruded through a profiled die, or cast on an embossed surface or under use of a vibrating docotr's knife.

An embodiment of the method is characterized in that said striations are formed generally perpendicular to the longitudinal direction of the film, and another embodiment is characterized in that said striations are formed on bias, e.g. forming an angle between about 25° and 65° with the longitudinal direction of the film. By either of the two embodiments it becomes possible to obtain products with their strength primarily in a transverse direction, but still with a strength in the longitudinal direction which is at least sufficient for the handling of the sheet before cross-lamination. This can be achieved (see below)

(*) by means of an embossed roller with helical embossment, or a vibrating edge or doctor's knife placed on bias, or a rotating, profiled annular extrusion die.

In most cases it is essential to avoid any substantial orienting of the length and width of the striations during orienting of the intervening portions. Already differences in thickness is a means to obtain this, but the differences in resistance to stretching are preferably further accentuated by keeping the intervening portions, while they are oriented, at a temperature higher than the temperature of the striations. This is preferably done by embossing the film on one surface only and feeding the smooth surface of the film over a heated member while suitably adapting the temperature of said member and the time of contact. Hereby the intervening portions can be heated to the optimum temperature for stretching while the thicker striations remain at a temperature where they exert a strong resistance to stretching. At the same time as an orientation of the striations is avoided, at least in substance, they are preferably moved relative to one another along their length while the intervening portions are oriented. There is hereby achieved a more uniaxial orientation and hence a higher splittability than by straight-forward orientation. The distance between the striations may be increased at the same time as they are moved along one another. It is within the scope of the invention, but is generally not suitable, to carry out the orientation by a simple spreading apart of the striations, i.e. without the above-mentioned displacement of the striations relative to and along one another. Care must further be taken that the holding-back and the pulling-off means of the stretching device do not engage one and the same striation, whereby the striations would be drawn in their longitudinal directions.

A very suitable manner of satisfying the above-mentioned preferred conditions is to carry out said relative movement of the striations and orientation of the intervening portions within a generally linear zone by change of the direction of advance of the film. As an alternative, if the striations are on bias, it is possible to carry out the stretching in an oven without any change of direction, but with a very long distance between the holding-back and the pulling-off means. The striations will then gradually move along one another during he orienting of the intervening portions, and the film will become narrower, while stretching of the striations can be avoided. Under these circumstances, however, it is difficult to maintain a temperature difference between the striations and the intervening portions, hence the stretching under change of direction is generally preferable.

When the intervening portions have been uniaxially oriented during displacement of the striations along one another, the relative movement of the striations along their length is preferably reverted during or after the splitting. This step will produce and/or spread apart the branchfibres, and is also preferably carried out by change of the direction of advance of the film. A transverse stretching method used for splitting of oriented film by change of direction is described in British Pat. No. 103.913, but the process can be simplified in connection with the present invention as the unsplittable striations bring the development of the splits in the film under control. However, it is also possible to initiate or carry out the full splitting process by a set of brushes or the like and use the second change of direction to spread apart the branchfibres thus formed.

For the final step of stretching, in which the striations (i.e. the stemfibres) are oriented in their longitudinal direction, a tenter-frame or the like is used. However, it may be preferable to apply a modified tentering device, as will be explained in connection with the description of FIG. 7.

As it will be understood from the foregoing, a precise embossment is important, and to achieve this an embodiment of the method is characterized in that only one surface of the film is embossed and that this surface is kept molten or semi-molten while the surface to remain smooth is solidified immediately before the embossment. Thus, the surface to remain smooth is preferably contacted with a cooling roller which may be the counterpart for the embossment, and cooled during a predetermined period, which leaves the major portion of the film molten to semi-molten, and immediately hereafter embossed on the side which can readily be deformed. The strong cooling on the other side serves to control the penetration of the embossment.

With the purpose of producing the two- or multi-layer sheets described above, still another embodiment of the method is characterized in that the film is formed from at least two layers of different polymer materials and that the proportion between the materials is changed during the embossing by mainly squeezing one or some of the components into the striations of the film from the intervening portions of the film. Said squeezing is automatically obtained by means of the tool for embossment when the fluidity of the layers is sufficiently different.

Said different fluidity can be achieved by use of materials of different melt viscosities. The most effective means, however, is to keep one of the materials solid and another semi-molten to molten during the embossment. Thus, strong cooling of one surface can be applied as described in the immediately foregoing, and/or the material which should resist squeezing can be chosen so that it has the highest melting point.

In the description of the layered product it is further specified that the branchfibres may be formed mainly of a very splittable polymer, while the stemfibres are formed of a less splittable material. To achieve this, the embodiment of the method which consists in forming more than one layer and squeezing the layers differently is adapted so that the material which mainly is squeezed is a material which is, in oriented state, relatively resistant to splitting, while the remaining material is a material which is, in oriented state, susceptible to splitting. Thus, one of the materials can be adapted for split resistance by addition of a generally compatible elastomer or other plasticizer, or by suitable copolymerisation. And/or another material can be adapted to become particularly splittable by blending with an incompatible, generally rigid polymer. In order to produce very fine splitfibres from the intervening portions an admixed, generally incompatible polymer may be partly or totally dissolved out prior to or after the splitting, as disclosed e.g. in British Pat. No. 1.148.382. In the intervening portions there will generally remain a rest of the layer which is intended to be squeezed away as much as practically possible. This rest can also be dissolved away or made fragile by swelling, without essentially affecting the strength of the stemfibres. The above-mentioned dissolving or swelling processes need not complicate the method substantially, as the portions to be dissolved out or swollen will generally form very small proportions of the entire sheet.

Figure 2:
Figure 3:
Figure 4:
Figure 5:
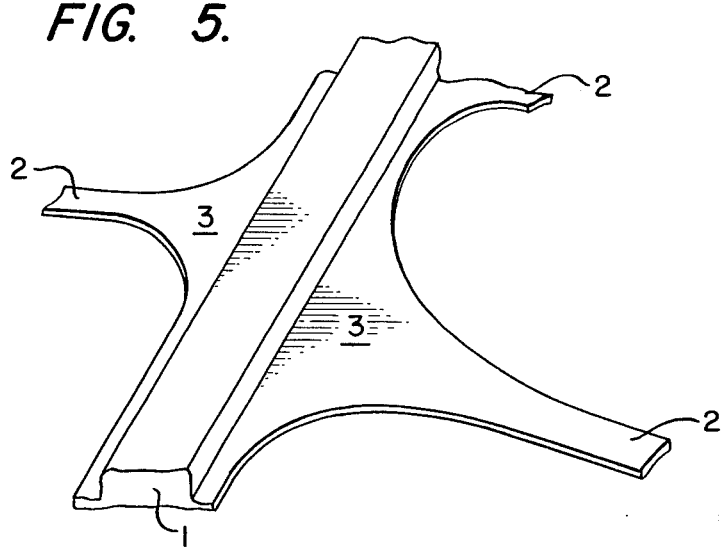
Figure 6:
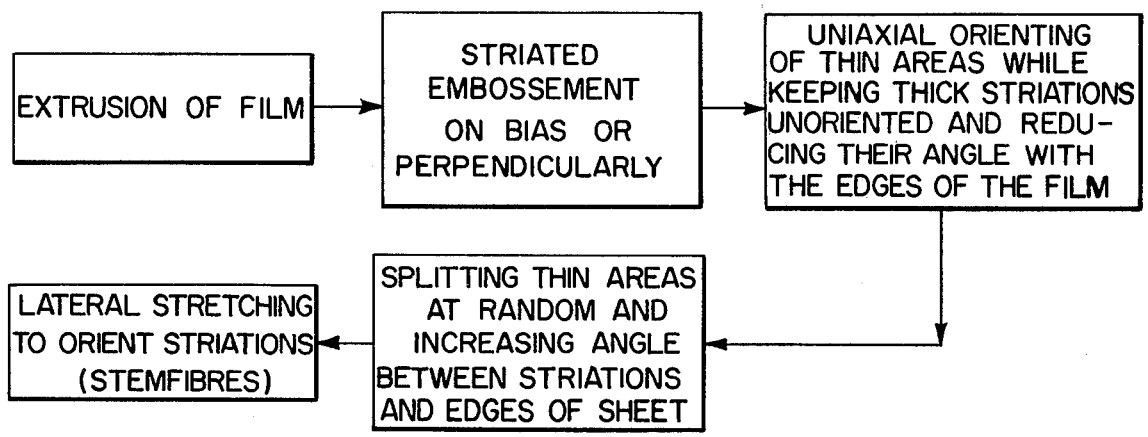
Figure 7:
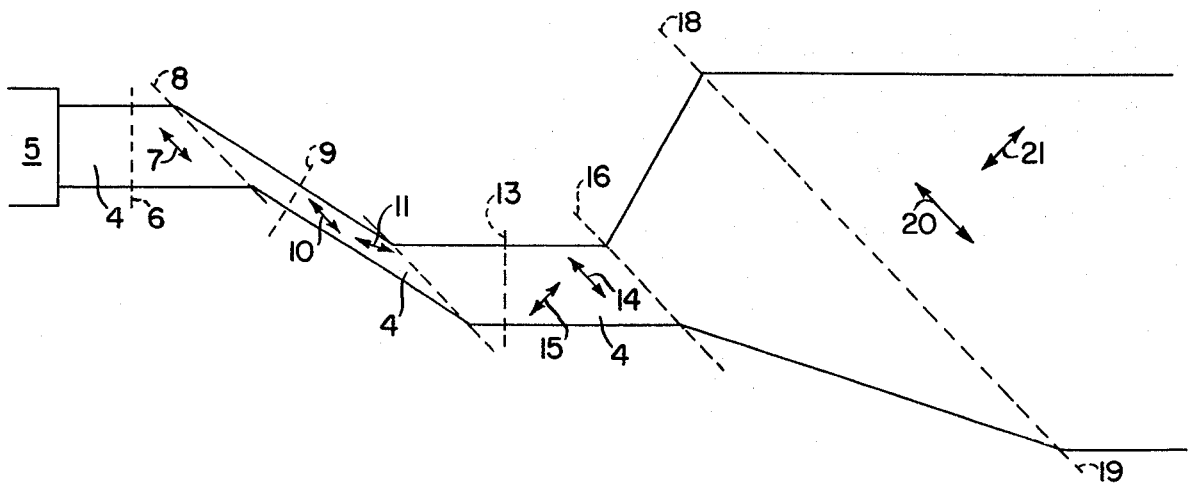
Figure 8:
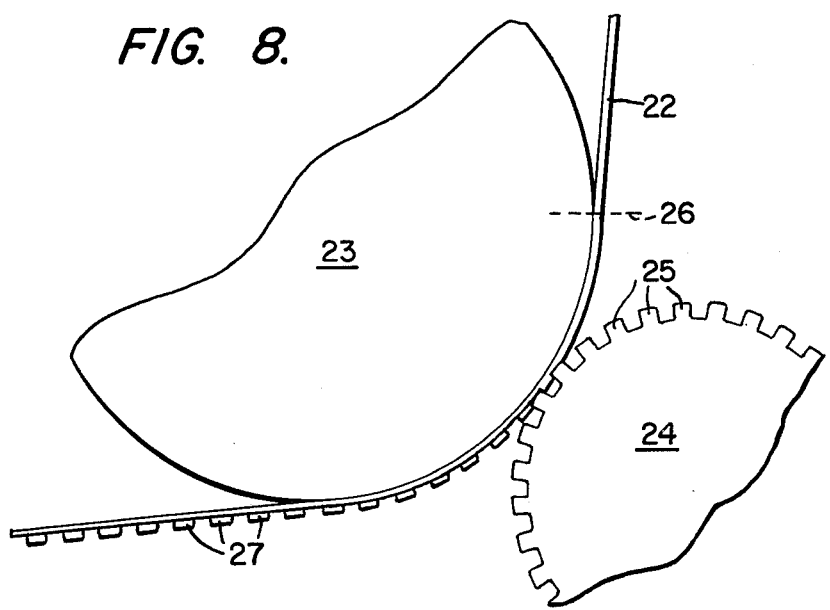
Figure 9:
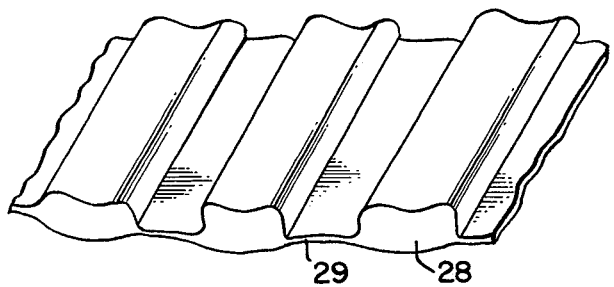
Figure 10:
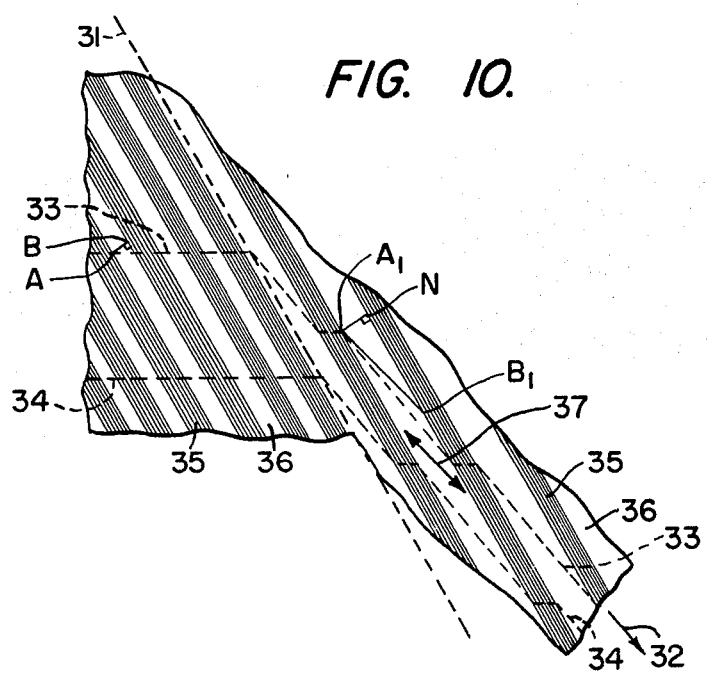

The invention will now be further described with reference to the drawings and photos of which FIGS. 1 to 4 are microphotos, in 16 times magnification, of different samples of the sheet product. FIG. 1 is an intermediate product after splitting of the thin areas to "branchfibres", but before stretching of the "stemfibres". FIGS. 2 and 4 are final products made from that shown in FIG. 1, the differences between the three samples being due to different stretching conditions FIG. 5 is a drawing in perspective view and highly magnified of a stemfibre and adjacent branchfibre portions FIG. 6 is a flow-sheet of a preferred process-line FIG. 7 is a schematical drawing of the process-line of FIG. 6 showing the directions of the stemfibres (striations) by thick arrows, and the directions of the branchfibres (orientation of thin areas) by thin arrows FIG. 8 shows the step of biased or penpendicular embossment of the film FIG. 9 shows the embossed film in perspective view and strong magnification FIG. 10 is a schematical, but more detailed drawing of the transformation leading to stretching of the thin portions of the embossed film, while the thicker striations are left undrawn and slide along one another FIG. 11 is similar to FIG. 8, but adapted to produce the sheet from two layers and to give the product different composition in the stemfibres and the branchfibres FIG. 12 in perspective view and strongly magnified, shows the embossed two-ply film made by the process of FIG. 11

Figure 11:
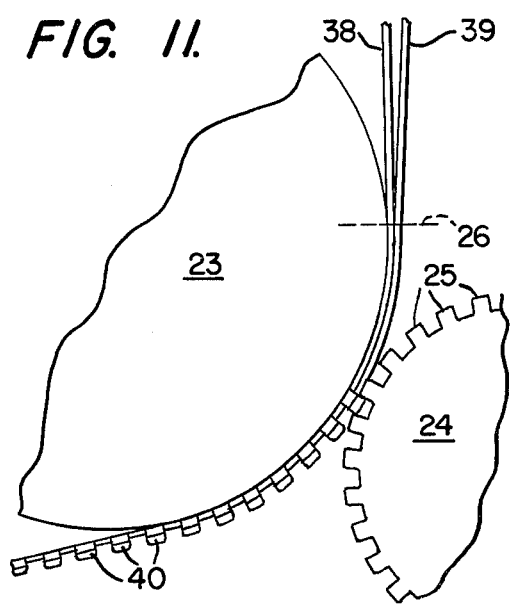
Figure 12:
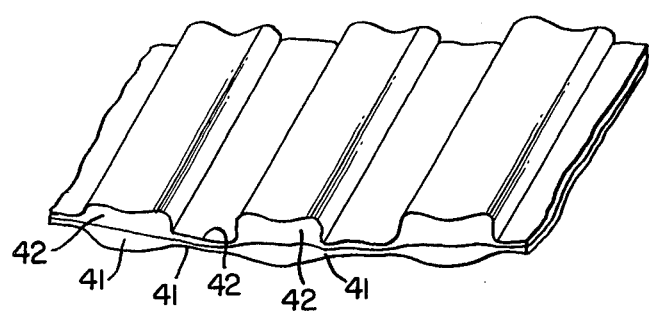
Figure 13:
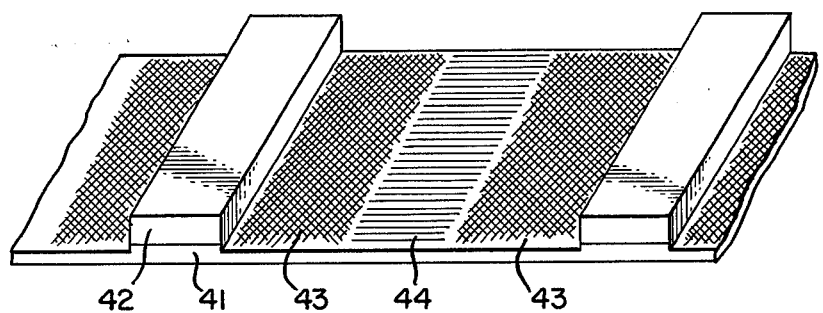

FIG. 13 in perspective view and strongly magnified, very schematically shows a final product resulting from the process of FIG. 11.

Figure 14:
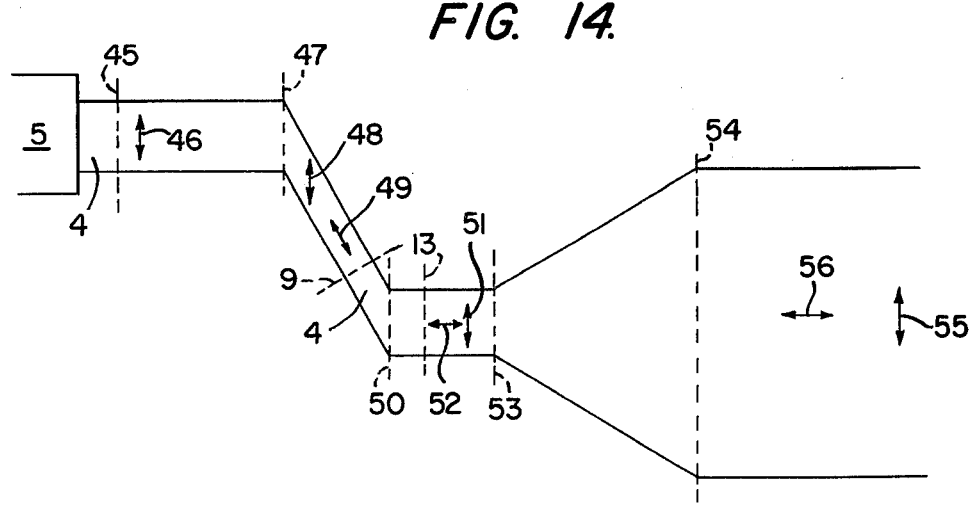

FIG. 14 is a schematical drawing representing longitudinal orienting of the thin intervening portions.

The samples shown in FIGS. 1 to 4 have been produced from an embossed polypropylene film where the thick striations and the thin areas have been of equal width, and the thin areas have been oriented at an angle of 15° to the striation. The splitting, represented by FIG. 1, has been produced by drawing apart the striations, whereby the film is disrupted to stemfibres and branchfibres.

In FIG. 2 the stemfibres have been oriented while the branchfibres were kept tentered. The latter hereby remain generally fibre-formed over the major part of their length, although the fibre-form is ribbon-like, but form biaxially oriented film portions where they are connected to the stemfibres. This product has high strength in the direction of the stemfibres and is very flexible. Thus, it is suitable e.g. as reinforcement in disposable fabrics.

The product of FIG. 3 has been produced by stretching the product of FIG. 2 almost in the direction formed by the branchfibres, while the stemfibres have been kept in a rather slack condition so that they have been allowed to get out of alignment. This form is generally preferred when the product is intended to be used as a single layer, e.g. for wrapping.

The product of FIG. 4 has also been produced from that of FIG. 2 by stretching of the stemfibres. In this case, however, the split-film portions forming the branchfibres have been allowed to contract and remain more film-formed, but split to a substructure of very fine fibres at the middle. In this form, where the stemfibres are close to one another, the product is very suitable as a layer in carpet backing.

In FIG. 5, 1 is a stemfibre and 2 are branchfibres, which form an integral unity with the stemfibre. The portions 3 adjacent to the stemfibres have remained in film-form and have become biaxially oriented by two stretching steps in different directions, viz. first the stretching taking place prior to the splitting, and subsequently the stretching caused by the orienting of the stemfibres.

In FIG. 7 which further explains the flow-sheet of FIG. 6, the film 4 is extruded from a flat die 5 and fed to a set of rollers 6 of which one is smooth and the other one is embossed in a fine helical line pattern under an angle of 45°. The film is embossed while it is generally semi-molten and is cooled down before it leaves the rollers 6. The embossing and cooling are further explained in connection with FIG. 8. The film 4, when leaving the embossment station 6, has thicker striations arranged under an angle of about 45°, as shown by arrow 7, and thinner, generally unoriented intervening portions.

The next station of the process route is an oblique, stretching taking place between a heated stretching bar 8 which is parallel to the direction 7 and a set of pull-off rollers 9. During the stretching, which takes place on the heated bar 8 and within a few cm following hereafter, the film is deflected to the side which — to illustrate the point — can produce a substanial reduction of the width, even if the longitudinal draw-ratio is very small. In the actual process, however, the longitudinal draw-ratio should be moderately high, e.g. between 1.5:1 and 5:1. The stretching is explained in more detail in connection with FIG. 10. There is provided for edge guide means (not shown). The stretching leaves the striations substantially unoriented but orient the intervening portions strongly. The direction of the striations, after the deflection of the film and the stretching, is indicated by the arrow 10, while the direction of the orientation, which is not exactly longitudinal, is indicated by the arrow 11. The splitting is carried out by a second deflection of the direction of advance, taking place in a linear zone 12, by which the width is increased. The zone 12 may be established by a special set of nip-rollers which is capable of conveying the film under angle, as shown. Such nip-rollers are disclosed in British Pat. No. 1.078,732. Each of these rollers consists of a rotating core-part and several circumferential section-parts which are adapted to slide to and fro on the core-part in synchronization with the rotation. The conveying action in the nip will hereby be the resultant of the rotation and the sliding of a section at the time when it is in the position where it forms part of the nip. In the drawing of the roller arrangement in said British Patent there is further shown a set of rubber conveyor belts, but this is not necessary in connection with the present invention.

The splitting of the oriented intervening portions now take place by a straight pulling-apart from the oblique nip. A set of ordinary nip-rollers 13 is used for this pulling, It is not intended that any portions of the sheet should be further oriented by the pull, but only that the stems (striations) should be dislocated while the oriented intervening portions are split. In the drawing the oblique nip-zone 12 is shown parallel to the striations in the film being fed to the nip (arrow 10). On principle this is the best manner of carrying out the splitting, but due to complications in construction of the special rollers for the nip 12 at the small angle which the striations usually will form, it may be preferred to use a bigger angle of the nip 12, e.g. 45°, and the transformation may in this case be repeated.

In any case the opening of the netstructure by deflection of the direction of advance should preferably be carried on to a point where the direction of the stemfibres, represented by the arrow 14 will again form an angle of about 45° with the direction of advance. It turns out that the direction of the branchfibres, represented by the arrow 15 will then with a good approximation become perpendicular to 14. The stemfibres are hereafter stretched in an oven (not shown) by means of a tenter-frame. If this tenter-frame is symmetrical, the stemfibres cannot, in essence, be stretched more than the branchfibres which are already highly oriented, or in other words, the branchfibres will "lock" the orientation of the stemfibres. For this reason the tentering is preferably arranged in assymmetrical manner as shown. In the zones 16 to 18 and 17 to 20 the sheet is gripped by the edgeholders, which are as usual fixed to stretching chains or the like, and the devices are assembled in such manner that 16 to 17 and 18 to 19 are both parallel to the stemfibre direction 14. Furthermore, the velocities of the chains are adapted to let the movement from 16 to 18 take the same time as the movement from 17 to 19. Hereby the stemfibre direction, see arrow 20, remain parallel to what it was before the stretching. Further, the directions of the chains are adapted to maintain the direction of the branchfibres, as shown by arrow 21.

It will be understood that it is a simplification to show the process-line in plane, as it is done in FIG. 7. In actual fact the film must generally follow the rollers and bars over a certain space. There may, however, be provided for rollers or bars to bring it back to nearly the same plane, e.g. after the stretching at 8 there may for this purpose be provided for a cooled bar (not shown) which is parallel to 8.

As mentioned above the branchfibres become generally perpendicular to the stemfibres after splitting when the stemfibres have been displaced along one another to a position where they form the same angle to the edge of the sheet as they did at the stage immediately after embossment. No matter what angle of striation is chosen from a few degrees up to and including 90°, said perpendicular relationship can be proved mathematically under the provision that the ratio of orientation within each thin area is relatively high. In order to become splittable the thin areas will generally have to be oriented at least at a ratio of 3.5:1, and this value is sufficiently high to lead to a generally perpendicular relationship between the stemfibres and the branchfibres. In this connection it should also be mentioned that in order to obtain high splittability, the ratio of orientation in each thin, intervening portion will usually be chosen higher than 3.5:1, e.g. in case of polypropylene or high density polyethylene it can be between 5:1 and 9:1 or even higher.

Thus, in case the striations are embossed perpendicularly to the edges of the film the branchfibres will become practically parallel to the edges of the sheet. In this case a usual symmetrical tenter-frame should be applied to stretch the stemfibres. This will be further described below in connection with FIG. 14.

In FIG. 8, the film 22 comes directly from the extrusion die and is still molten when it meets the smooth cooling roller 23, which also acts as counterpart for the embossed roller 24. The latter is supplied with very fine cogs 25 in form of geneatrices or helices. The cross-section of each cog is here shown rectangular, but the edges should preferably be slightly rounded and there should preferably be formed a slip for easy release of the film after embossment. There are further means to apply a release agent on the embossed roller (not shown).

Before the start of the process-line, the two rollers 23 and 24 are adjusted to touch each other slightly. During the process the surface portion of the film 22 which is adjacent to roller 23 will solidify, while the cooling zone from the contact line 26 to the nip is adjusted (by means not shown) to let the other surface portion remain molten to semi-molten until it goes into the nip. The solid portion of the film controls the depth of the impression, and it is hereby possible to obtain a rather precise thickness of the thin portions even when the average film thickness is as low as, e.g. 50 microns. The molten to seme-molten filmportion is preferably solidified before the film leaves the roller 23.

The film 22 is now supplied with striations 27, generally between 0.2 and 5 mm wide. For most purposes it is convenient to make the striations and the intervening portions of about equal width or to make the intervening portions the narrower.

FIG. 9 shows a realistic form of the transversely or obliquely embossed film where the striations 28 have acquired a "sausage" shaped cross-section which is usual when film is embossed, and the intervening portions 29 are very much thinner.

In FIG. 10, which more detailed shows the process at 8 in FIG. 7, the film is fed in the direction 30 towards the linear stretching zone 31 and pulled away in the other direction 32.

The drawing only comprises a small portion of the width of the film, not including the edges, but in order to illustrate the stretching better there are shown two dotted lines 33 and 34 which are, before the stretching, parallel to the edges and the feed direction 30, but become zig-zag-formed after the stretching. The stretching zone is shown as a true line 31, but will usually comprise several striations and intervening portions. Merely as a signature, the striations 35 are marked with parallel lines, while the intervening portions 36 have no signature. On principle, the striations maintain both their length and thickness constant, but in practice, it is difficult to avoid a small elongation, e.g. 10%.

While the striations are displaced along one anoher, they are also, but to a smaller extent, drawn apart, with the result that the intervening portions become uniaxially oriented in the direction shown by arrow 37.

In the following there will be given more quantitative information regarding the stretching.

Two points A and B define the width of the striations before stretching. Corresponding points, after stretching, are $A_1$ and $B_1$. With a good approximation the line $A_1B_1$ will be parallel to the direction of the orientation produced 37, and the stretching ratio will be approximately equal $$\frac{A_1B_1}{AB}.$$

The projection N of the point $A_1$ is drawn, $A_1N$ defining the width of the striations after stretching. The following terms are used:

$$\text{the relative shear } S_r = \frac{NB_1}{AB}$$

$$\text{the relative spreading } d_r = \frac{A_1B_1}{AB}$$

The change of direction from 30 to 32 ia adapted to the stretching ratio in such a manner that the orientation becomes truly uniaxial, i.e. biaxial orientation is avoided. During a true uniaxial orientation the distances along the minor axis of stretching will always contract in the same ratio as the thickness, i.e. both contract in the ratio of $\sqrt{n}$, where n is the stretching ratio along the major axis. Thus, the area stretching ratio will be $$\frac{n}{\sqrt{n}} = \sqrt{n}.$$

Using the terms defined above, and bearing in mind that the striations keep their length constant during the stretching, the area stretching ratio for each intervening portion will be equal to the relative spreading, i.e. $d_r = \sqrt{n}$. Compared to the approximate equation $$n = \frac{A_1B_1}{AB},$$

while considering the triangle, $A_1NB_1$ this shows that $d_r$ forms a rather small part of the stretching and that the following equation is a fair approximation $$n = \frac{NB_1}{AB},$$

i.e. $S_r = r$.

For each chosen set of parameters, i.e. angle of striation, proportion between widths of striations and intervening portions, and stretch ratio in the direction of orientation, it is hereafter possible to calculate the preferable angle between 30 and 32.

In FIG. 11, two films of different materials 38 and 39 are extruded from two different extrusion dies or two slots in one and the same die. They can also be coextruded from one and the same slot. The embossment takes place as in FIG. 8, but the adjustment is simplified if the film 38 has higher melting point than the film 39. The resultant embossed two layers film 40 is shown more detailed in FIG. 12 and as it appears, both components have been squeezed into the striations, however, the layer 42 formed from the film 39 has been squeezed much more than the layer 41 formed from the film 38. For several purposed, the rests of layer 42 are wholly or partly dissolved away from the thin, intervening portions.

It is possible to obtain a very fine splitting if the layer 41 i.e. the film 38 is made from a blend of polymers which are relatively incompatible with each other, in particular when one of said polymers is dissolved out of layer 41 or swollen before the splitting and/or during the stretching of the stems. This is illustrated in FIG. 13. In the intervening portions, layer 41 has here been split to a porous web consisting of very fine fibrils in branching-off relationship with one another. Webs of this nature are dealt with in British Pat. No. 1.148.382 from which it also appears that each fine fibril may be a crystal formation of a diameter amounting to a few microns, or even below 1 micron. The splitapart fibrils or crystal threads may, however, also be partly joined to clusters. For the sake of simplicity the individual fibrils are not shown in FIG. 13, but are symbolized with the criss-crossing and straight lines. In the areas 43 adjacent to the stems the structure can be said to exhibit a more biaxial character than in the middle zone 44. Thus, there are generally several "layers" of criss-crossing fibres in the areas 43 and a smaller amount of criss-crossing in the areas 44. This criss-crossing effect does not, of course, show any predetermined pattern, but is a result of random deflection of each fine fibril procuded by the splitting and the stretching of the stems. Of course, there is no sharp border between 43 and 44, but the film changes gradually from a more to a less pronounced biaxial character.

In this connection, "uniaxial character" and "biaxial character" do not necessarily refer to strong molecular orientation, since it is known from the above-mentioned British Pat. No. 1.148.382 that the formation of the fibrils takes place partly in the melt by the dragging-out of the submicroscopically fine polymer portions which are dispersed in one another, and partly by a segregation while the highest melting polymer crystallizes.

In order to reduce the costs of dissolving out or swelling a component, the layer 41 is preferably made very thin, and the intervening portions may be down to about 2 grams per sq. meter in the split product. Even in such small proportion, the layer has high importance as it supplies the sheet with a textile feel and appearance. When the sheet is used e.g. as a layer in disposable fabrics, the fine fibrils in layer 41 should form a surface of the fabric.

As it will be understood, the step of orienting the intervening portions subsequent to the embossment can be omitted in this embodiment of the invention, as the formation of a fibrillar microstructure taking place during extrusion and cooling may substitute this step.

The line of FIG. 14 deviates from that of FIG. 7, first at the embossing station, where a set of rollers 45 produce a perpendicular striation in the film 4 as indicated by the arrow 46. The hold-back for the subsequent stretching is effected by a set of heated nip-rollers 47 and no further edge-hold means are necessary. Like in FIG. 7, the direction of advance is hereafter deflected and the film is drawn by means of another set of rollers 9. The direction of striation 48 will hereby, on principle, remain parallel to the former direction of striation 46 while the intervening film portions will become longitudinally oriented as shown by arrow 49. The hold-back means for the splitting is a set of section-rollers 50 working like 12 in FIG. 7, but under a less acute angle. Like in FIG. 7, the pulling which effects the splitting is produced by a set of ordinary nip-rollers 13. Hereby the direction of striation turns perpendicular again, as shown by arrow 51. At the same time the direction of orientation, i.e. the branchfibre direction remain almost parallel to the longitudinal direction of the sheet, as shown by arrow 52. The stemfibres therefore can be drawn in an ordinary symmetrical tenterframe, the entrance to and exit from which are shown by the dotted lines 53 and 54, respectively, whereby the perpendicular direction of the stemfibres 55 and the longitudinal direction of the branchfibres 56 are maintained.

EXAMPLE 1

A film from polypropylene having melt index 7 according to ASTM D1238-62T, condition L is embossed, while still semi-molten, under an angle of 45°. The width and thickness of the striations are 0.68 and 0.35 mm, respectively, and the width and thickness of the intervening portions are 0.38 and 0.058 mm, respectively.

The film is thereafter stretched over a heated bar, placed under an angle of 45°, and is pulled- off in average stretching ratio 3.5:1 while deflected 20° from the feed direction, whereby the direction of striation is reduced to 25°. The bar is heated to 150°C, and the time of contact is adjusted to heat the thin portions to 125°C.

After cooling, the film is transversely stretched from zone to zone in zones which follow the direction of striations, and is hereby split. Finally, the stems are oriented at 125°C in ratio 5:1.

EXAMPLE 2

From a dual slot die there is extruded a two-layer film, where one layer — forming 75% of the product — consists of the same polypropylene as in example 1. The other film — forming 25% of the product — consists of 80% polypropylene and 20% polystyrene, which have been intimately hot blended in a planetary screw extruder. The blend has melt index 5, according to the specification mentioned in example 1.

The film is treated as in FIG. 1, the plain polypropylene layer forming the surface which is cooled before the embossment (see FIG. 11). Hereby it will mainly be the plain polypropylene which is squeezed away and into the striations. The effect will be that finer branch-fibres are produced.

EXAMPLE 3

The same dual slot die is used as in example 2, but the components are:
1. a copolymer of nylon 6 and nylon 66 (usually called nylon 6A) having melting point at 180°C and melt index 3.5 according to ASTM D1238-62T, condition K
2. 35% polyethylene and 65% nylon 6, thoroughly blended in the planetary screw extruder and having melt index 1.5 under the same conditions as (1).

The two films are extruded in equal proportions, the total thickness being 0.3 mm, and are thereafter embossed as in example 1, the embossment taking place on the side formed by nylon 6A. During the embossment, the nylon 6A is kept about its melting point, whereby the nylon 6 will be distinctly solid.

No cold stretching is carried out to orient the thin areas. The skin of nylon 6A is partly removed, and the rests are made fragile, by dipping the embossed sheet a few seconds in methyl alcohol and immediately thereafter in water. Thereafter the sheet is treated about 10 seconds in boiling xylene to partly remove and partly swell the polyethylene.

When it is thereafter sheared to spread the stemfibres apart, a very soft web of fine branchfibres will be formed.

What I claim is:
1. A method of manufacturing a recticular sheet comprised of relatively long and thick, parallel, uniaxially oriented stemfibers and relatively short and thin intervening branchfibers integral with said stemfibers, said branchfibers being biaxially oriented and generally film-sjaped in the regions thereof adjacent to the stemfibers and generally uniaxially oriented and more fiber-shaped in the other regions, said process comprising the steps of producing in a generally unoriented polymer film a pattern of alternating relatively thick elongated striations and relatively thin intervening bands, said striation and bands extending continuously across the film with their lengthwise direction making an angle in the range from a few degrees to about 90° relative to the longitudinal direction of said film; advancing the striated film in a lengthwise direction to a holding-back means engaging the film generally parallel to the stria- tion angle, removing the film from said means along a path which is deflected transversely from said initial direction of advance at an angle which is sufficiently small to produce a substantial reduction in film width while drawing the film at a ratio of at least about 3.5:1, thereby to stretch and uniaxially orient said thin bands while said thick striations undergo bodily lengthwise displacement relative to one another without stretching; splitting the oriented intervening bands into uniaxially oriented branchfibers while maintaining said striations substantially intact and unoriented; and finally stretching said striations generally in the direction of their length to orient the same generally uniaxially in said direction, so as to form said striations into uniaxially oriented stemfibers, and simultaneously impart biaxial orientation to said branchfibers in the areas thereof adjacent to the stemfibers.

2. A method according to claim 1 wherein said striations extend lengthwise generally perpendicular to the longitudinal directions of the film.

3. A method according to claim 1 wherein said striations extend lengthwise at an angle between about 25°–65° to the longitudinal direction of the film.

4. A method according to claim 1 wherein the intervening bands while being oriented are kept at a temperature higher than the temperature of the striations.

5. A method according to claim 1 wherein said pattern is produced by embossing only one surface of the film, said one surface being kept in molten to semi-molten condition while the opposite surface is solidified immediately before embossing and thus remains smooth.

6. A method according to claim 1 wherein the film is formed from at least two layers of different polymer materials and then embossed with said pattern, material from one layer being displaced laterally from the intervening bands of the film into the striated regions thereof to increase the thickness of the latter during the embossing step.

7. A method according to claim 6 wherein the polymeric material which is displaced is selected to exhibit relative resistance to splitting, while the other polymeric material is selected to exhibit, in an oriented stage, susceptibility to splitting.

8. A method according to claim 7 wherein one of the incompatible polymers is removed or swelled either before the splitting step or during the orientation by stretching of the striations.

9. A method according to claim 6 wherein one of the materials is kept solid and another in semi-molten to molten condition during the embossing step.

10. A method according to claim 7 wherein the polymer material having susceptibility to splitting consists of a blend of incompatible polymers.

11. A method of manufacturing a recticular sheet comprised of relatively long and thick, parallel, uniaxially oriented stemfibers and relatively short and thin intervening branchfibers integral with said stemfibers, said branchfibers being biaxially oriented and generally film-shaped in the regions thereof adjacent to the stemfibers and generally uniaxially oriented and more fiber-shaped in the other regions, said process comprising the steps of producing in a generally unoriented polymer film a pattern of alternating relatively thick elongated striations and relatively thin intervening bands, said striation and bands extending continuously across the film with their lengthwise direction making an angle in the range from a few degrees to about 90° relative to the longitudinal direction of said film; advancing the striated film in a lengthwise direction to a holding-back means engaging the film generally parallel to the striation angle; removing the film from said means along a path which is deflected transversely from said initial direction of advance at an angle relative to said holding-back locus which is smaller than the angle of said locus relative to said advance direction, whereby the deflected film undergoes a reduction in width, while drawing the film at a ratio of at last about 3.5:1 to stretch and uniaxially orient said thin bands while said thick striations undergo bodily lengthwise displacement relative to one another without stretching; advancing the thus selectively stretched film on said deflected path to a second holding-back means engaging said film generally parallel to said striations; removing said film from said second means along a path which is further deflected from said deflected path at an angle generally reverse to said first deflection angle and sufficiently great to increase the film width and thus split the oriented intervening bands while said striations ungergo bodily lengthwise relative displacement in a generally reverse direction and remain intact; and finally stretching the entire film in the lengthwise direction of said striations to orient the same generally uniaxially in said direction, so as to form said striations into uniaxially oriented stemfibers, and simultaneously impart biaxial orientation to said branchfibers in the areas thereof adjacent to the stemfibers.

* * * * *